United States Patent [19]
Graybill et al.

[11] 3,767,976
[45] Oct. 23, 1973

[54] CIRCUIT BREAKER CONNECTION TO GAS INSULATED BUS

[75] Inventors: Howard W. Graybill; Walter M. Wilson, both of Greensburg, Pa.

[73] Assignee: I-T-E Imperial Corporation, Philadelphia, Pa.

[22] Filed: Oct. 27, 1972

[21] Appl. No.: 301,642

[52] U.S. Cl. ........ 317/103, 174/DIG. 10, 200/148 R
[51] Int. Cl. .......................... H02b 1/18, H02b 1/20
[58] Field of Search .................. 174/18, 23 R, 31 R, 174/DIG. 10; 200/148 R; 317/103

[56] References Cited
UNITED STATES PATENTS 3,526,734   9/1970   McKeough .................... 200/148 R
3,643,003   2/1972   Graybill ............................... 174/18

*Primary Examiner*—Laramie E. Askin
*Attorney*—Sydney G. Faber et al.

[57] ABSTRACT

A gas-filled disconnect switch is mounted above and connected to a gas circuit breaker bushing. The switch is mechanically supported by the breaker tank. A removable conductor and grounded enclosure section between the switch and circuit breaker permits removal of current transformers and of the circuit breaker without depressurizing the disconnect switch or removing power from the bus connected to the disconnect switch.

8 Claims, 3 Drawing Figures

CIRCUIT BREAKER CONNECTION TO GAS INSULATED BUS

RELATED APPLICATIONS

This application is related to application Ser. No. 301,643, filed Oct. 27, 1972 entitled CONDUCTOR SUPPORT FOR TRANSITION FROM GAS BUS ENCLOSURE TUBE TO POWER CIRCUIT BREAKER, in the name of G. P. Guaglione, assigned to the assignee of this invention.

BACKGROUND OF THE INVENTION

This invention relates to electrical power, gas insulated substations, and more particularly relates to a novel removable, mechanical connection between a high power gas circuit breaker and a gas-filled disconnect switch.

In high voltage pressurized-gas-insulated substations, all of the conventional substation components (i.e., circuit breakers, disconnecting switches, lightning arresters, coupling capacitors, and connecting bus) are enclosed in grounded metal housings, and high-voltage portions of the components are inslated from the grounded enclosures by an insulating gas such as sulfur hexafluoride. The high dielectric strength of such gases, under pressure, permits reduction of ground clearances, and open gaps to about 10 percent of those required in open air, and permits reduction of space required for the switchgear to about one-tenth that required for open air construction. The fact that there are no exposed high voltage parts and no exposed insulation provides in such substations a degree of safety and reliability never before available.

However, in adapting conventional equipment to such gas-insulated "mini-substations," certain problems arise. One such problem occurs at the entrance of the gas-insulated bus into the grounded tank of a circuit breaker. In order to minimize space requirements, breaker disconnect switches are mounted vertically above the breaker bushings. Current transformers to sense the current flow through the breakers are mounted around the breaker connections, between the circuit breaker and the disconnect switches.

In accordance with the present invention, the breaker disconnect switches are supported from the breaker tanks, so that no separate structures or foundations are required to support the switches. Moreover, means are provided for removing and replacing the doughnut type current transformers while the disconnect switch is pressurized and the upper electrode of the switch is energized. If desired, an entire circuit breaker can be removed, while all the switches are pressurized and their top electrodes energized.

DETAILED DESCRIPTION OF THE DRAWINGS

Figure 1:
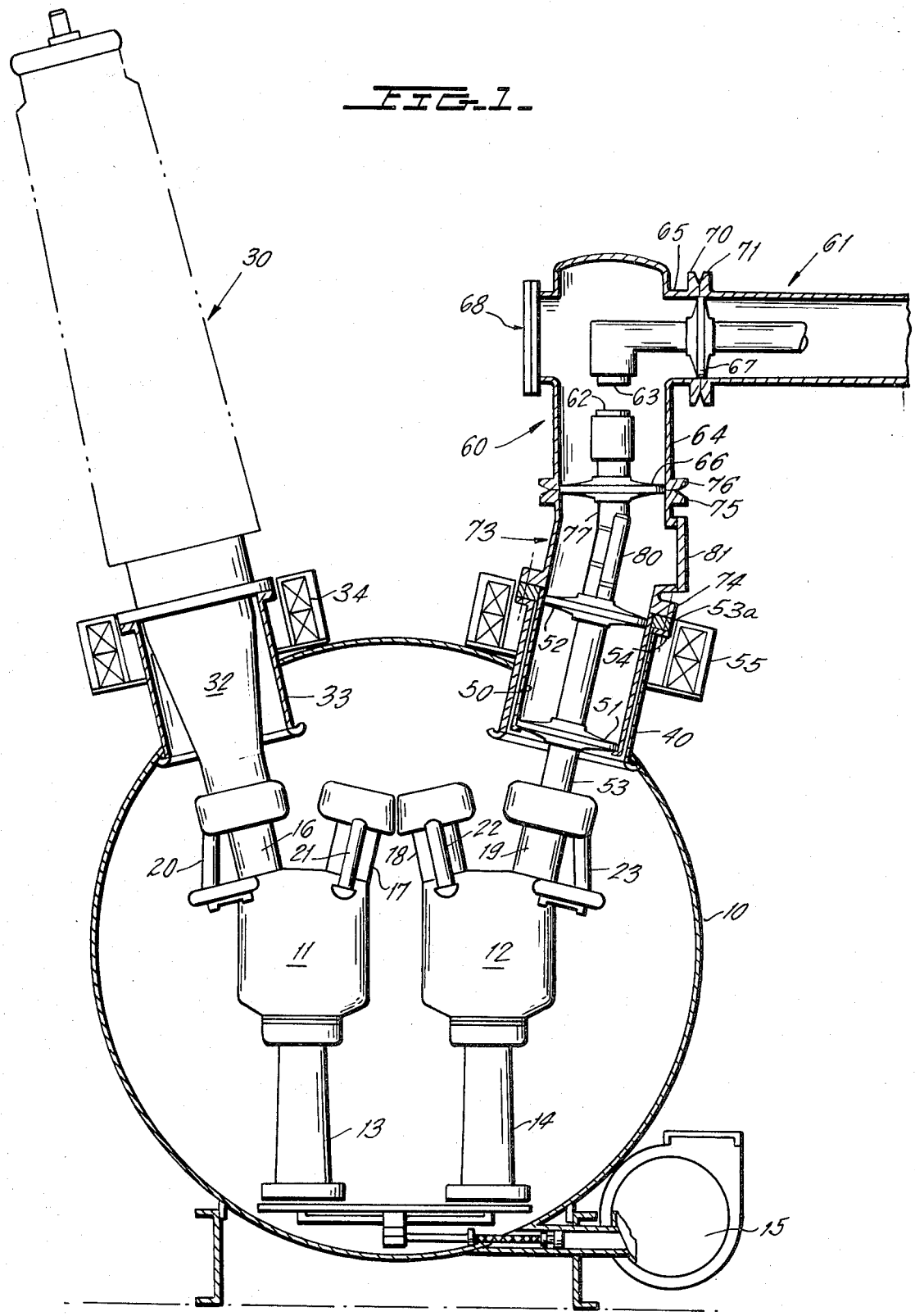
FIG. 1 is a plan view, partly in cross-section, to show one phase of a power circuit breaker employing the novel transition disk.

Referring first to FIG. 1, there is shown a power circuit breaker, such as a 230 KV breaker which may be of the type shown in U.S. Pat. No. 3,526,734. Thus, there is provided a grounded housing 10 which is filled with $SF_6$ at relatively low pressure, for example, 3 atmospheres. Two high pressure reservoirs 11 and 12 are mounted on insulators 13 and 14 respectively within tank 10, and are supplied with high pressure $SF_6$ from high pressure reservoir 15. Each of high pressure tanks 11 and 12 supports pairs of interrupters 16–17 and 18–19 respectively which may each have appropriate impedances 20 to 23 respectively across their contacts. Each of interrupters 16 to 19 is connected in series with one another to define four series breaks for the circuit breaker. While these interrupters are operating, high pressure gas from reservoirs 11 and 12 is released through the contact gap and into the low pressure interior in the manner described in the above patent.

A conventional entrance bushing 30 is shown in FIG. 1. Thus, bushing 30 has a central bushing conductor connected to interrupter 16 and supported relative to tank 10 by a conical insulator portion 32. Conical insulator 32 is suitably fixed to the breaker bushing pocket 33. A current transformer 34 surrounds the breaker bushing pocket 33 as shown.

Conventionally, a second entrance bushing, similar to bushing 30, would pass through breaker bushing pocket 40 for connection to interrupter 19. In accordance with one aspect of this invention, and where the transition is to be made to a gas-filled bus, or gas-filled disconnect switch, or the like, an insulation disk is used to form a conductor support and gas seal. Note that the entrance bushing 30 of FIG. 1 could be replaced by this type structure if desired.

The novel transition structure consists of a conductive tube 50 having spaced disk insulators 51 and 52 suitably secured at its opposite ends. A conductor 53, extending from interrupter 19, passes through and is sealed relative to spaced insulators 51 and 52 and thereby is supported relative to pocket 40. More specifically, tube 50 is welded to bolt ring 53a which is, in turn, bolted with a gas-tight seal to the flange 54 of bushing pocket 40. Note that bushing pocket 40 supports and is surrounded by current transformer 55. Note that disk 51 serves as a primary gas seal as well as a conductor support. Moreover, the voltage distribution across disk 51 is favorable as compared to the distribution across conical insulator 32.

A major advantage of the novel transition is that it allows low construction height. Moreover, it allows the vertical mounting of a gas-filled disconnect switch, which is, in turn, connected to a gas bus run, without exceeding the height of the conventional entrance bushing 30. Thus, in FIG. 1, there is shown an $SF_6$ filled disconnect switch 60 which is, in turn, connected to a gas-filled transmission line 61.

More specifically, disconnect switch 60 is formed of cooperable contacts 62 and 63 which are supported within generally cylindrical sections 64 and 65 respectively by disk insulators 66 and 67 respectively. A manhold 68 provides access to switch 60.

One end of switch 60 is connected by bolt-connecting flanges 70 and 71 to the elongated gas-filled bus 61. The other end of switch 60 is connected to conductor 53 through triangular transition joint 73. Joint 73 is terminated at opposite ends by flanges 74 and 75 respectively. Flange 74 is bolted to flange 53a and flange 75 is connected to flange 76 of cylinder 64. Conductor 77, extending from contact 62, is connected to the upper end of conductor 53 by the T-shaped conductor 80 which may be suitably bolted to span the conductor ends. A handhole 81 is provided to allow this connection to be conveniently made.

Figure 2:
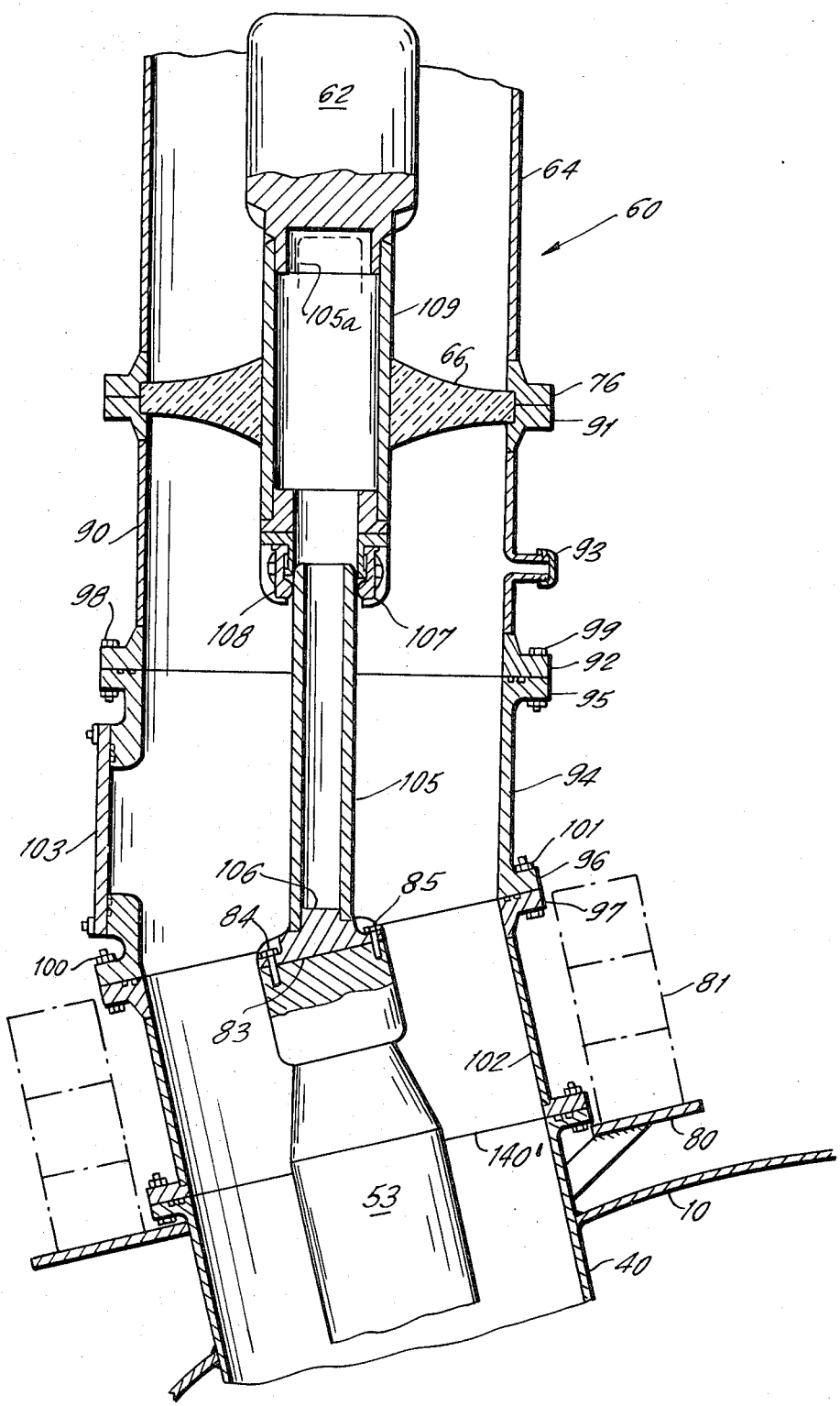
FIG. 2 is a cross-sectional view of a modification of a transition like that of FIG. 1 which, however, is modified in a novel way to allow easy disconnection between the disconnect switch and power circuit breaker.
Figure 3:
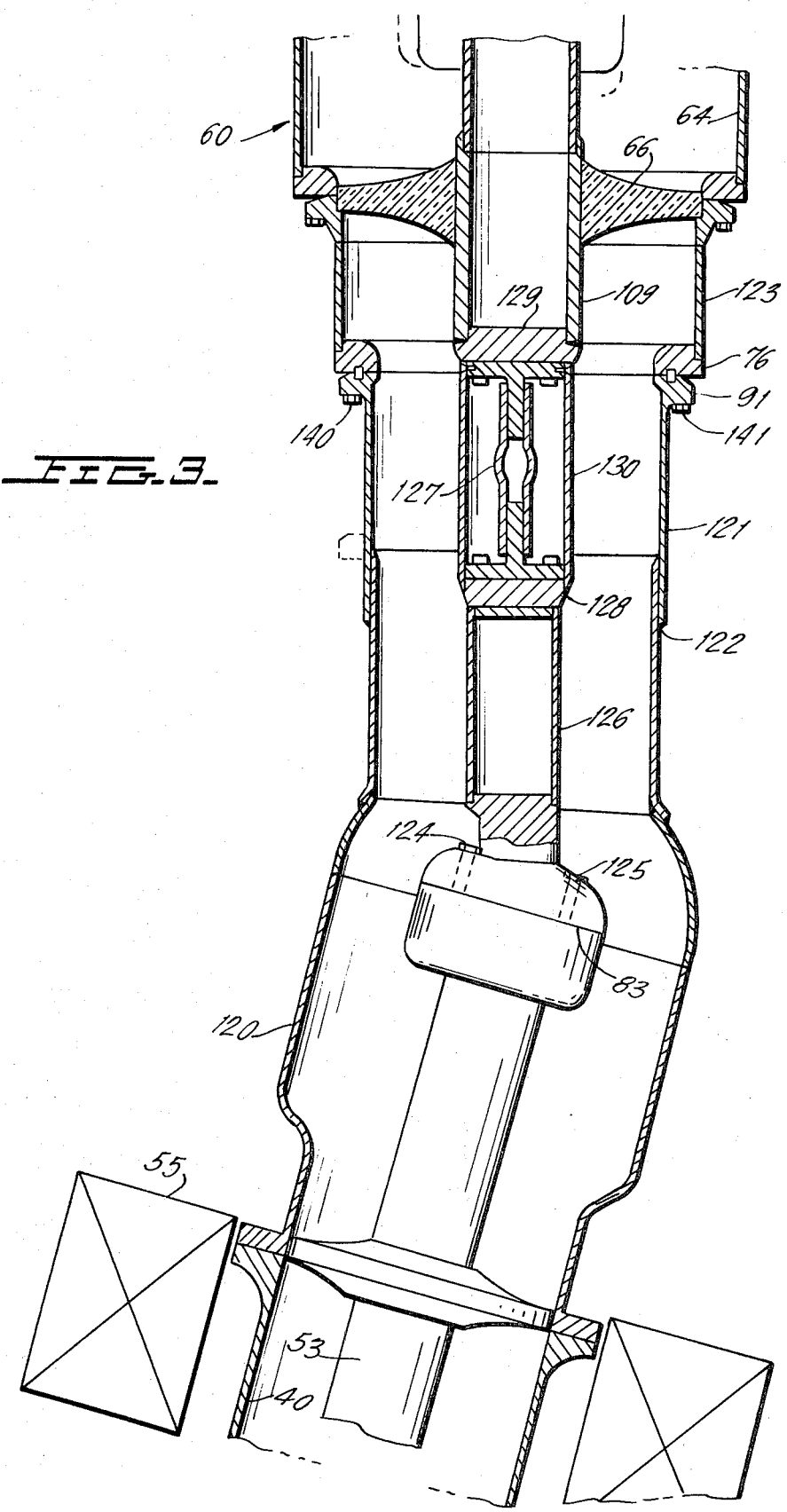
FIG. 3 is a further embodiment of the connection structure of FIG. 2.

In the above, an auxiliary support structure or foundation may be provided to support switch 60. FIGS. 2 and 3 show a novel connection structure at joint 73 of FIG. 1 which makes auxiliary support structures unnecessary, and which simplifies the connection and disconnection procedure at joint 73 for replacement of current transformers or breakers without depressurizing the disconnect switch 60 and while contact 63 is still energized. Moreover, the novel connection structure of FIGS. 2 and 3 could be applied to other breaker transition terminals than that shown in FIG. 1 for conductor 53.

Referring to FIG. 2, there is shown a portion of tank 10 of FIG. 1 and of pocket 40 of FIG. 1. FIG. 2 further shows the provision of a platform 80, secured to pocket 40, for supporting the schematically shown current transformer 81. Conductor 53 of FIG. 1 is also shown extending through pocket 40. Conductor 53 in FIG. 2 terminates at face 83 and contains tapped openings (not shown) to receive connection bolts such as bolts 84 and 85, as will be later described.

FIG. 2 further shows a portion of the disconnect switch 60 of FIG. 1, including housing 64, switch jaw 62, disk insulator 66 and flange 76. Note that disk 66 forms a gas-tight seal with housing 64.

The disconnect switch 60 of FIG. 2 further has an extending cylindrical housing portion 90 having flange 91 connected to flange 76. Housing portion 90 further has a bottom flange 92 and a gas-fill port 93. A removable triangular section 94 is then provided with flanges 95 and 96 which are connected in gas-tight relation to flanges 92 and 97 respectively by bolts such as bolts 98–99 and 100–101 respectively. Flange 97 is formed on extension cylinder 102 of pocket 40. An access port 103 is formed in section 94 to gain access to sliding conductive tube 105.

Sliding tube 105 has a bolt ring 106 on its bottom which is bolted to conductor 53 by bolts 84 and 85. The upper end of tube 105 is slidably received by inwardly biased contact fingers 107 and 108 and can slide into the tubular conductor 109 welded to the disconnect switch jaw contact 62. Tube 105 can reach the dotted-line position 105a shown in FIG. 2.

If it should ever become necessary to change, add, or remove one of the current transformers 81, the construction of FIG. 2 permits the following procedure:

(1) Attach gas reclaimer hose to fill port 93 and pump $SF_6$ gas out of the enclosure between gas barrier 66 and the breaker bushing or a further barrier, such as barrier 51 of FIG. 1.

(2) Remove the access port cover 103.

(3) Remove the bolts 84 and 85 attaching the small diameter, sliding conductor tube 105 to the top of the bushing.

(4) Provide temporary scaffolding to support the disconnecting switch 60 in place.

(5) Remove bolts 98–99 and 100–101 from the top and bottom flanges of the removable section 94 of the grounded enclosure tube.

(6) Reaching in through the access port 103, slide the small diameter conductor tube 105 up into the large diameter tube 109 above, and slide the removable enclosure section 94 toward the left, removing it completely.

(7) Raise the current transformers 81, one at a time, and slide them horizontally through the gap in the conductor and enclosure tubes 90 and 102 provided in steps (1) through (5) above.

By following steps (1) through (6) above on each of the six bushings of a three-phase breaker, the complete three-pole circuit breaker can be removed and the entire breaker replaced, if necessary. After the necessary work has been performed, the removable section 94 is replaced, the sliding conductor tube 105 is dropped and bolted in place on the bushing, the access port 103 replaced, and the section between the gas barrier 66 and the breaker bushing evacuated and repressurized with $SF_6$ gas.

It will be noted that all of the above work can be done while the disconnecting switch housing 60 is pressurized, and, with the disconnect switch 60 open and a grounding switch (not shown) closed to ground, so that the work can be done with the upper switch contact (63 in FIG. 1) energized at normal voltage.

Another embodiment of the invention is shown in FIG. 3. In FIG. 3 components similar to those in FIG. 1 or 2 have similar numerals. In this arrangement, the metal enclosure 120 surrounding the upper portion of conductor 53 is also connected to the breaker bushing pocket 40 with a flanged, bolted, gasketed and insulated joint. A telescoping tubular metal housing 121 is attached to enclosure 120 near the top by means of a fillet weld 122. The top of the telescoping housing 121 is attached to the bottom of the disconnecting switch housing 123 by means of a flanged, bolted and gasketed joint including flanges 76 and 91.

Internally, a conductor tube 126 is connected to and supported from the top of the conductor 53 by six bolts, such as bolts 124 and 125. A gap between the conductor tube 126 and the disconnect switch conductor tube 109 is normally bridged with a multiplicty of flexible metal connectors 127, which are bolted to lower and upper terminals 128 and 129 attached, respectively, to the bushing and disconnect switch conductor tubes 126 and 109. The flexible connectors 127 are covered with an electrostatic shield 130 (normally attached with screws to the upper terminal, not shown) to avoid concentration of dielectric stress at sharp edges in this area.

As in FIG. 2, normally the weight of the disconnecting switch 60 is rigidly supported from the breaker bushing pocket 40 by the enclosure tubes 120 and 121 welded and bolted into a rigid assembly.

To replace, add, or remove one of the current transformer 55, the following steps are followed with this construction:

(1) Pump the $SF_6$ gas out of the section between the gas-tight barrier insulator 66 in the disconnect switch and the breaker bushing or disk insulator.

(2) Provide temporary scaffolding to support the disconnecting switch 60 in place.

(3) Using an electric or pneumatic chisel, chip off the weld 122 at the bottom of the telescoping metal housing 121.

(4) Remove the bolts 140 and 141 from the flanged joint between flanges 76 and 91 at the top of the telescoping metal housing 121.

(5) Drop the telescoping metal housing 121 as far as it will go.

(6) Remove the screws at the top of the electrostatic shield 130, and drop the shield 130 as far as it will go.

(7) Unbolt and remove the flexible connectors 127 and terminals.

Steps (1) through (7) immediately above provide a gap in both conductor and enclosure tubes, permitting removal and replacement of current transformers 55, and permitting the entire circuit breaker to be removed or replaced, if necessary.

It will be seen from FIGS. 2 and 3 that means are provided for supporting the disconnecting switch assemblies 60 from the circuit breaker tanks, requiring no additional space and no separate supporting structures for the switches. At the same time, simple means are provided for establishing an open gap in both the conductor and enclosure between the breaker and the disconnect switches, to permit replacing current transformers or moving the breaker while the disconnect switch and bus above are pressurized and energized at normal voltage.

Finally, means are provided for insulating the enclosure tube joint at teh breaker bushing, to prevent induced currents in the enclosure from flowing through the current transformers and thus giving incorrect current indication. Thus, in FIG. 2 an insulation gasket 140' prevents the flow of induced currents in the tank from circulating current in the enclosure tube.

Although there has been described a preferred embodiment of this invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. In a gas insulated electrical substation, a transition connection between a gas-filled circuit breaker and a gas-filled disconnect switch; said gas-filled circuit breaker comprising a metallic tank filled with a dielectric gas under positive pressure and having a hollow cylindrical member extending therethrough and a terminal conductor extending through and insulated from said cylindrical member, and a current transformer encircling said terminal conductor; said gas-filled disconnect switch including a cylindrical switch housing, a switch contact member and a conductive tube member connected to said switch contact member, and insulator disk suppport means supporting said conductive tube member relative to said cylindrical switch housing; said terminal conductor having an end which is spaced from an end of said conductive tube member, which spacing would normally disconnect said circuit breaker from said disconnect switch; said transition connection including a central removable conductor connectible between said end of said terminal conductor and said end of said condutive tube member, and an outer enclosure generally surrounding said central removable conductor and having first and second ends; said first and second ends of said outer enclosure being respectively removably connected to respective opposing and spaced ends of said hollow cylindrical member which extends through said circuit breaker tank, and said cylindrical switch housing of said gas-filled disconnect switch; and removable section means in said outer enclosure to afford access to said central removable conductor to enable connection and disconnection of said central removable conductor, whereby movement of said removable conductor to a removed position and removal of said outer enclosure enables removal of said current transformer.

2. The transition connection of claim 1 wherein said outer enclosure is gas-tight and is filled with a dielectric gas under positive pressure.

3. The transition connection of claim 2 wherein said insulator disk support means serves as a seal for gas filling said disconnect switch when said outer enclosure is removed; and fill port means in said outer enclosure to permit withdrawal and filling of gas therein.

4. The transition connection of claim 1 wherein said removable conductor is bolt-connected to said terminal conductor end.

5. The transition connection of claim 1 wherein said removable conductor is bolt-connected to said terminal conductor end and to said end of said conductive tube member.

6. The transition connection of claim 1 wherein said removable conductor is bolt-connected to one of said ends of said terminal conductor and said conductive tube member and is slidably connected to the other end thereof.

7. The transition connection of claim 1 wherein said disconnect switch is mounted vertically above said circuit breaker tank and is mechanically supported therefrom by said outer enclosure and said removable conductor.

8. The transition connection of claim 7 wherein said removable connector has first and second ends which are disposed in respective planes and are at an angle to one another.

* * * * *